(12) United States Patent
Garimella et al.

(10) Patent No.: US 8,640,445 B2
(45) Date of Patent: Feb. 4, 2014

(54) MULTI-LEG EXHAUST AFTER-TREATMENT SYSTEM AND METHOD

(75) Inventors: Phanindra Garimella, Bloomington, IN (US); Ousmane Gueye, Greenwood, IN (US); Anita Singhal, Kokomo, IN (US); Randy W. Nelson, Columbus, IN (US); Axel zur Loye, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 79 days.

(21) Appl. No.: 13/298,049

(22) Filed: Nov. 16, 2011

(65) Prior Publication Data

US 2012/0210697 A1   Aug. 23, 2012

Related U.S. Application Data

(60) Provisional application No. 61/420,427, filed on Dec. 7, 2010.

(51) Int. Cl.
*F01N 3/00* (2006.01)

(52) U.S. Cl.
USPC ............. 60/286; 60/274; 60/287; 60/288; 60/292; 60/297; 60/301; 60/303

(58) Field of Classification Search
USPC ........... 60/274, 286, 287, 288, 291, 292, 295, 60/297, 303, 324, 301
See application file for complete search history.

(56) References Cited

U.S. PATENT DOCUMENTS

| | | | |
|---|---|---|---|
| 5,067,319 A | | 11/1991 | Moser |
| 6,779,339 B1 * | | 8/2004 | Laroo et al. ............ 60/297 |
| 7,073,465 B2 | | 7/2006 | Woll et al. |
| 7,640,728 B2 * | | 1/2010 | Yoshizaki et al. ............ 60/286 |
| 7,665,297 B2 * | | 2/2010 | Suzuki et al. ............ 60/287 |
| 7,908,844 B2 * | | 3/2011 | Kamoshita et al. ............ 60/286 |
| 8,056,337 B2 * | | 11/2011 | Hokuto et al. ............ 60/602 |
| 8,256,214 B2 * | | 9/2012 | Rioli et al. ............ 60/324 |
| 2008/0173010 A1 | | 7/2008 | Suresh et al. |
| 2010/0313550 A1 | | 12/2010 | Kopp et al. |

FOREIGN PATENT DOCUMENTS

| WO | 02/14659 A1 | 2/2002 |
|---|---|---|
| WO | 2010/126521 A1 | 11/2010 |

OTHER PUBLICATIONS

Notification of Transmittal of the International Search Report and the Written Opinion of the International Searching Authority, or the Declaration dated Mar. 26, 2012; International Application No. PCT/US2011/061041.

* cited by examiner

*Primary Examiner* — Binh Q Tran
(74) *Attorney, Agent, or Firm* — Foley & Lardner LLP

(57) ABSTRACT

This disclosure provides an exhaust flow detection and variable dosing system and method for treating exhaust flow from an engine. The system includes first and second exhaust flow legs, a cross passage connecting these legs upstream of SCRs and a sensor positioned along the cross passage to detect at least one of differential pressure between the exhaust flow legs, and exhaust flow in the cross passage. A dosing circuit connects a dosing treatment supply to each of the exhaust flow legs at or upstream of the SCRs, and at least one dosing device positioned along the dosing circuit to control the amount of the dosing agent delivered to each exhaust leg. An electronic control unit controls the amount of a dosing agent delivered to the exhaust flow legs independently based on exhaust flows determined for each leg using at least one of the differential pressure and cross passage exhaust flow.

14 Claims, 2 Drawing Sheets

MULTI-LEG EXHAUST AFTER-TREATMENT SYSTEM AND METHOD

TECHNICAL FIELD

The inventions relate to internal combustion engines with multi-leg after-treatment systems and, more particularly, to methods of detecting exhaust flow in each exhaust leg of a diesel engine during operation.

BACKGROUND

Environmental concerns have resulted in increasingly strict regulation of engine emissions by governmental agencies. For example, reduction of nitrogen-oxygen compounds (NOx) in exhaust emissions from internal combustion engines has become increasingly important and current indications are that this trend will continue.

Future emission levels of diesel engines will have to be reduced in order to meet Environmental Protection Agency (EPA) regulated levels. For example, proposed Ultra-Low Emissions Vehicle (ULEV) emission levels for light-duty vehicles up to model year 2004 are 0.2 gm/mi NOx and 0.08 gm/mi particulate matter (PM). Beginning with the 2004 model year, all light-duty Low Emission Vehicles (LEVs) and Ultra-Low Emission Vehicles (ULEVs) in California have to meet a 0.05 gm/mi NOx standard to be phased in over a three year period. In addition to the NOx standard, a full useful life PM standard of 0.01 gm/mi also have to be met. The EPA has also proposed tighter regulations for off-road diesel engines, requiring them to emit 90% less particulate matter and nitrogen oxides, by 2014 than they do today.

Traditional methods of in-cylinder emission reduction techniques such as exhaust gas recirculation (EGR) and injection rate shaping, by themselves will not be able to achieve these low emission levels required by the standards. After-treatment technologies will have to be used, and will have to be further developed in order to meet the future low emission requirements of the diesel engine.

A promising after-treatment technology designed to meet future NOx emission standards is Selective Catalytic Reduction (SCR) catalysts which have the potential to greatly reduce NOx emissions from internal combustion engines. Under some operating conditions SCR catalysts can reduce the level of NOx emitted from an internal combustion engine by as much as 60-90%. In SCR catalytic reduction systems, a reductant, such as urea, is introduced into the exhaust stream upstream of the catalyst chamber to react with the NOx on the surface of the precious metal catalyst to convert NOx into nitrogen and water vapor which is then released into the atmosphere. An accurate measurement of the exhaust flow is required in order to dose the correct amount of urea for obtaining the maximum NOx conversion efficiency with minimal NH3 slip at the tailpipe of the system.

SUMMARY OF THE INVENTION

The invention provides an exhaust flow detection and variable dosing system for treating exhaust flow from an engine, comprising a first exhaust flow leg positioned to receive the exhaust flow from the engine; a first selective catalytic reducer positioned along the first exhaust flow leg; a second exhaust flow leg positioned to receive the exhaust flow from the engine in parallel to the exhaust flow in the first exhaust flow leg; a second selective catalytic reducer positioned along the second exhaust flow leg; a cross passage connecting the first and the second exhaust flow legs upstream of the selective catalytic reducers to receive exhaust flow; and a sensor positioned along the cross passage to detect at least one of differential pressure between the first and the second exhaust flow legs, and exhaust flow in the cross passage. The sensor is adapted to generate a cross passage signal corresponding to at least one of the differential pressure and the cross passage exhaust flow. The system also includes a dosing treatment supply containing a dosing agent; a dosing circuit connecting the dosing treatment supply to each of the first and the second exhaust flow legs at or upstream of the first and the second selective catalytic reducers; at least one dosing device positioned along the dosing circuit to control the amount of the dosing agent delivered to each exhaust leg; and an electronic control unit adapted to receive the cross passage signal and independently control the amount of the dosing agent delivered to the first and the second exhaust flow legs based on the cross passage signal.

The system may also include an oxidation catalyst and a particulate filter in each of the first and the second exhaust flow legs upstream of a connection of the dosing circuit to the first and the second exhaust flow legs. The cross passage may be connected to the first and the second exhaust legs downstream of the particulate filter. The sensor may be differential pressure sensor connected to the cross passage at two locations, and the cross passage may include a venturi positioned between the two locations. The sensor may comprise at least one mass flow sensor. The electronic control unit may be adapted to generate a dosing control signal based on the cross passage signal to control the at least one dosing device to vary the amount of the dosing agent delivered to at least one of the first and the second exhaust flow legs. The electronic control unit may be adapted to determine an exhaust mass flow for each of the first and the second exhaust flow legs based on the cross passage signal, determine a NOx mass flow in each of the first and the second exhaust flow legs based on the respective exhaust mass flow, and control the amount of the dosing agent delivered to at least one of the first and the second exhaust legs based on the respective NOx mass flow.

A method of detecting exhaust flow and treating exhaust flow in an engine exhaust system having multiple exhaust legs is also provided that includes flowing exhaust gas through a first exhaust flow leg containing a first selective catalytic reducer; flowing exhaust gas through a second exhaust flow leg containing a second selective catalytic reducer and positioned in parallel to the exhaust flow in the first exhaust flow leg; detecting a differential pressure between the first and the second exhaust flow legs and generating a pressure signal corresponding to the differential pressure. The method also includes delivering an amount of a dosing agent to each of the first and the second exhaust flow legs based on the pressure signal.

The method may further include generating a dosing control signal based on the pressure signal to control the amount of the dosing agent delivered to at least one of the first and the second exhaust flow legs, and determining an exhaust mass flow for each of the first and the second exhaust flow legs based on the pressure signal. The method may further include determining a NOx mass flow in each of the first and the second exhaust flow legs based on the respective exhaust mass flow, and controlling the amount of the dosing agent delivered to at least one of the first and the second exhaust legs based on the respective NOx mass flow. The method may further include a venturi connected to both the first exhaust flow leg and the second exhaust flow leg, and a pressure sensor to detect the differential pressure across the venturi.

The invention also provides a method of detecting exhaust flow and treating exhaust flow in an engine exhaust system having multiple exhaust legs, comprising flowing exhaust gas through a first exhaust flow leg containing a first selective catalytic reducer; flowing exhaust gas through a second exhaust flow leg containing a second selective catalytic reducer and positioned in parallel to the exhaust flow in the first exhaust flow leg; providing a cross passage connecting the first and the second exhaust flow legs upstream of the selective catalytic reducers to receive exhaust flow; detecting a mass flow of the exhaust gas flowing in the cross passage and generating a mass flow; and delivering an amount of a dosing agent to each of the first and the second exhaust flow legs based on the mass flow signal. The method may also include generating a dosing control signal based on the mass flow signal to control the amount of the dosing agent delivered to at least one of the first and the second exhaust flow legs. The method may further include determining an exhaust mass flow for each of the first and the second exhaust flow legs based on the mass flow signal, determining a NOx mass flow in each of the first and the second exhaust flow legs based on the respective exhaust mass flow, and controlling the amount of the dosing agent delivered to at least one of the first and the second exhaust legs based on the respective NOx mass flow.

Advantages and features of the present invention will become more apparent from the following detailed description of the preferred embodiments of the present invention when viewed in conjunction with the accompanying drawings.

DETAILED DESCRIPTION

Applicant has recognized the need to more precisely control the amount of reductant, e.g. urea or ammonia, injected into each leg of a multi-leg exhaust after-treatment system. If too much reductant is injected, the reductant may undesirably pass through the system to the atmosphere thereby increasing operation costs while also possibly contaminating the environment with increased slip of NH3 from the tailpipe of the system into the atmosphere. In addition, excess reductant or dosing agent may accumulate in the catalyst in a manner which deters the conversion effectiveness of the catalyst. On the other hand, an inadequate amount of reductant supplied to the SCR chamber may reduce emissions conversion by the SCR device possibly resulting in emissions noncompliance. The exemplary embodiments consistent with the claimed inventions provide an engine having an exhaust after-treatment system that maintains minimal variability in the NOx emissions exiting the exhaust system thereby maintaining desirable emissions conversion efficiency for emissions compliance and minimizing associated fuel economy penalties, while minimizing the release of un-reacted reductant into the atmosphere.

Figure 1:
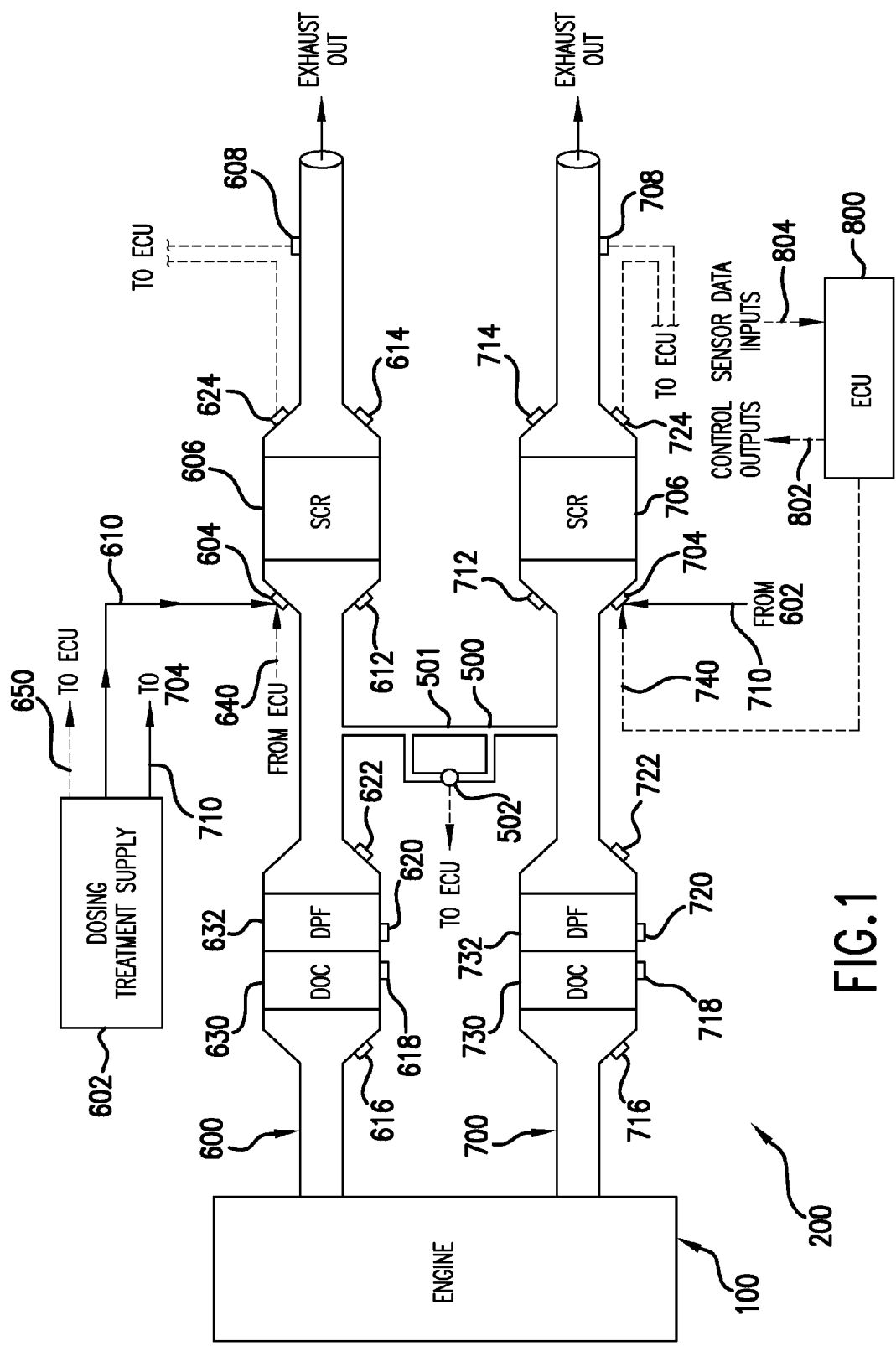
FIG. 1 is a schematic block diagram of a multi leg urea dosed after-treatment system according to an exemplary embodiment with DOC, (Diesel Oxidation Catalyst), DPF (Diesel Particulate Filter), and SCR (Selective Catalytic Reduction chamber) used to reduce NOx emission produced by an internal combustion engine.

Referring now to FIG. 1, illustrated is a schematic block diagram of an exemplary embodiment of an internal combustion engine 100 with a multi-leg exhaust gas after-treatment system 200 for implementing the method consistent with the claimed inventions. System 200 may be used to remove particulates and various chemical compounds from exhaust gas created by internal combustion engine 100. System 200 includes exhaust legs 600 and 700, connected to the engine to receive exhaust gas from the engine 100. Exhaust legs 600, 700 may be connected downstream of a common exhaust manifold. Also engine 100 may include one or more turbochargers. Each leg 600, 700 includes a diesel oxidation catalyst (DOC) 630, 730 and a diesel particulate filter (DPF) 632, 732 positioned downstream of the respective DOC 630, 730. DOC 630, 730 and DPF 632, 732 may be any conventional DOC and DPF devices well known in the art. Each leg 600, 700 also includes a selective catalytic reduction (SCR) device 606, 706 positioned downstream of the respective DPF 632, 732 for removing NOx emissions from the exhaust gas. Each SCR device 606, 706 includes an absorber or catalyst, such as a manufactured from various ceramic materials used as a carrier, such as titanium oxide, and active catalytic components such as either oxides of base metals (such as vanadium and tungsten), zeolites, or various precious metals.

In addition, a dosing system is provided in the form of a dosing treatment supply 602 and dosing devices, i.e. injectors, 604, 704, fluidly connected to dosing treatment supply 602 by respective dosing circuits 610, 710. The dosing system may also include a pump (not shown). A reductant, such as ammonia or urea, stored in dosing treatment supply 602, is selectively and controllably added to the exhaust flow upstream of the SCR devices 606, 706 and absorbed onto the SCR catalyst where it is used to convert the NOx emissions in the exhaust gas flow to nitrogen and water, and in the case of urea, also into carbon dioxide. The predetermined amount of reductant to be injected into one leg of the system 200 may be delivered in a particular rate shape, such as disclosed in U.S. Pat. No. 7,587,890, the entire contents of which is hereby incorporated by reference.

An electronic control module or unit 800 is used to process data received from various sensors, detectors, and components relating to engine and exhaust system conditions, and to generate control signals based on this information and perhaps other information, for example, stored in a database or memory integral to or separate from ECU 800. ECU 800 may include a processor and software modules or routines that are executable by the ECU 800. In alternative embodiments, ECU 800 may include electronic circuits for performing some or all of the processing, including analog and/or digital circuitry. The modules may comprise a combination of electronic circuits and microprocessor based components. Electronic control unit 800 may be integral with the engine control unit, or exist as a separate component. For example, ECU 800 may receive data indicative of engine performance, and exhaust gas composition including but not limited to engine sensor data, such as engine position sensor data, speed sensor data, exhaust mass flow sensor data, fuel rate data, pressure sensor data, temperature sensor data from locations throughout the engine and the exhaust system, NOx sensor data, and other data, all indicated generally as sensor data inputs 804. ECU 800 may then generate control signals or outputs 802 to control various components in the engine and exhaust system. In particular, in the exemplary embodiments consistent with the claimed inventions, ECU 800 is operably connected to dosing devices 604, 704 by wired or wireless connections 640, 740 so that a control signal generated by ECU 800 is transmitted to devices 604, 704 to control the level or amount of reductant dosing.

Exhaust after-treatment system 200 may include various sensors and detectors for sensing and generating data relating to aspects of the exhaust system. For example, each leg may be equipped with an unspent urea sensor 624, 724 detecting the amount of urea present in the exhaust flow downstream of SCR device 606, 706 and reporting this information to ECU 800. Sensors 608, 708 are NOx emissions sensors to detect the amount of NOx emissions in the exhaust stream. Other sensors 612, 614, 616, 618, 620, and 622 may be provided at various locations along the exhaust system. However, these and other sensors may include pressure sensors, lambda sensors and mass air flow sensors. Each sensor position can be equipped with more than one sensor so as to provide redundant data affirming a more accurate operation, or redundancy in its basic form, to assure a lower failure rate. Each sensor connects to ECU 800 to report its data via a data signal as an input shown generally at 804.

Most importantly, in the exemplary embodiment of FIG. 1, a feature is incorporated to detect a differential pressure between exhaust legs 600 and 700. Specifically, the feature includes a cross passage 500 having one end communicating with exhaust leg 600 upstream of SCR device 606 and an opposite end communicating with exhaust leg 700 upstream of SCR device 706, and a pressure differential sensor 502 positioned to measure the pressure drop/difference across cross passage 500. Cross passage 500 is preferably sized and dimensioned with a cross-sectional flow area smaller than the cross-sectional flow area of each of exhaust legs 600, 700. For example, the cross-sectional flow area of cross passage 500 may be approximately 0.01-0.04 m². As a result, cross passage 500 permits only a small amount of exhaust gas to flow through cross passage 500. An orifice or venturi 501 may be provided along cross passage 500 to create a measurable pressure drop based on the pressure difference between exhaust legs 600 and 700. Pressure differential sensor 502 may be fluidly connected to cross passage 500 on either side of orifice or venturi 501 to enable differential pressure sensing. In another exemplary embodiment, cross passage 500 may be sized small enough to create a pressure drop without the need for a specific orifice or venturi. Pressure differential sensor 502 may be any sensor or detector capable of sensing the pressure difference across cross passage 500, i.e. across orifice or venturi 501. For example, in another exemplary embodiment, a pressure differential sensor, such as a diaphragm type sensor, may be positioned within cross passage 500. Regardless of the type of sensor, a data signal representative of the pressure differential is delivered to ECU 800.

Figure 2:
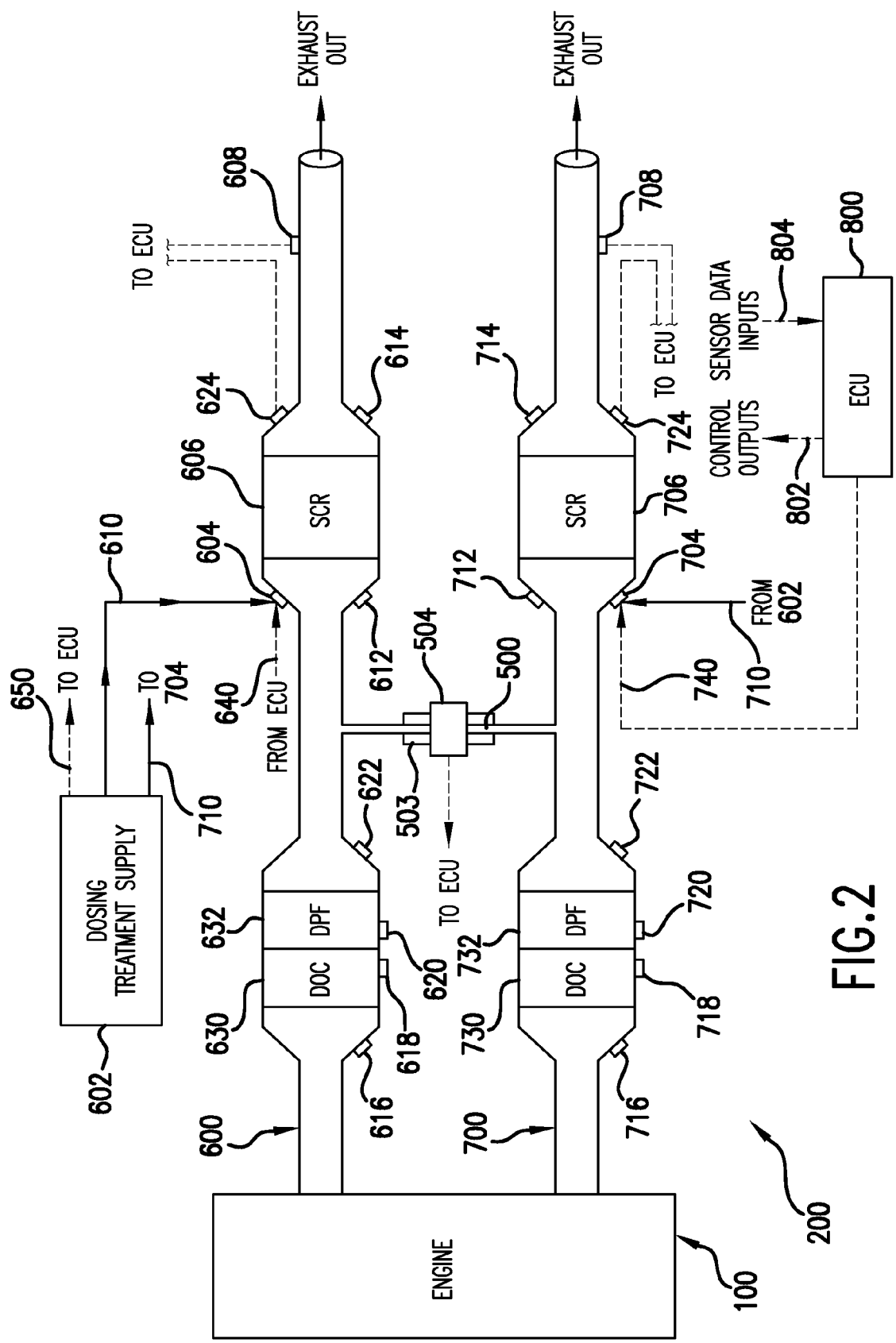
FIG. 2 is a schematic block diagram of another exemplary embodiment similar to the embodiment of FIG. 1 except one or more mass air flow sensors are used to detect the exhaust flow in the cross passage.

FIG. 2 illustrates another exemplary embodiment of the exhaust after-treatment system and method which is similar to the embodiment of FIG. 1 except a mass air flow sensor 504 is used in cross passage 500 instead of pressure differential sensor 502. The mass flow sensor 504 is positioned in cross passage 500 to measure or detect the exhaust gas flow between legs 600 and 700. Mass flow sensor 504 may be of the type that works more effectively at lower temperatures. In this case, a cooling mechanism 503, such as a jacket of engine coolant or engine oil, may be provided along cross passage 500 to reduce the exhaust gas temperature in cross passage 500. Mass flow sensor 504 may be either made using the hot-wire anemometer principle of operation or could utilize any other mechanism such as the use of ultrasonic or surface acoustic-wave type to measure flow.

During operation, exhaust gas is generated by engine 100 and flows into respective legs 600, 700 of exhaust after-treatment system 200. The exhaust gas continues in each leg flowing through DOC 630, 730, DPF 632, 732, and then through SCR devices 606, 706 before exiting the system through the exhaust outlet, or common tail pipe, depicted as "exhaust out". In order to dose the accurate amount of urea needed to convert NOx emissions and maintain SCR conversion efficiency at an optimum level, a volumetric estimate of the amount of NOx in the exhaust is needed for an accurate dosing calculation. Therefore, an accurate measurement of the exhaust flow, from which to calculate the amount of NOx, is needed. In addition, the exhaust flow in each leg 600, 700 will be different, and will vary throughout operation due to the presence of the DPFs 632, 732 and other components that likely cause a difference in back pressure in the legs and thus a difference in the amount of exhaust flow through the legs. For example, the exhaust flow through DPFs 632, 732 will vary as the filter element becomes loaded with particulate matter creating more back pressure and then are regenerated resulting in less back pressure. Dosing the same amount of reductant, i.e. urea, to each leg with the assumption that the exhaust flow is the same in each leg throughout operation would necessarily result in less than optimum NOx conversion. System 200 provides an accurate estimate of the flow difference between the legs, thus permitting determination of the exhaust flow, and consequently the NOx flow, in each leg thereby ensuring accurate reductant dosing into both legs.

Specifically, system 200 and the associated method permits a small amount of exhaust gas to enter cross passage 500 for sensing by differential pressure sensor 502 or mass air flow sensor 504. In other embodiments, the sensors 502 and 504 could be used in combination and/or multiple sensors used for redundancy or to provide numerous pressure and/or flow data for ECU 800 to process. The pressure differential signal generated by differential pressure sensor 502, or the mass flow signal generated by mass flow sensor 504, is sent to ECU 800 and processed using standard equations and known engine data to determine the NOx mass flow which is then used to control and adjust the reductant dose for each leg independently thereby achieving optimum NOx conversion without excess reductant use. More specifically, a standard volumetric efficiency calculation for the particular engine provides the total exhaust mass flow, e.g., 10 kg/min, out of engine 100 upstream of both legs 600, 700. The difference in back pressure in the legs causes the exhaust flow to be different in the legs so that the exhaust flow is not necessarily the same, e.g. 5 kg/min, but some other split, such as 7 kg/min in leg 600 and 3 kg/min in leg 700. Sensors 502 and 504 provide a measurement of the amount of the respective measured characteristic, i.e. differential pressure, such as 0.5 kPa, or mass flow, such as 4 kg/min, and also provide an indication of the leg having the higher pressure or flow by sensing the direction of the flow within cross passage 500. In order to determine the exhaust flow in each leg, ECU 800 uses the pressure differential data from sensor 502, or mass flow data from sensor 504, the indication of the leg having the higher pressure or flow and/or the leg having the lower pressure or flow, and standard flow orifice equations, to determine the exhaust mass flow in each leg. The exhaust flow value for each leg can then be used by ECU 800 to determine the NOx mass flow, for example, using the following equation:

$$\dot{m}_{NOx} = NOx_{ppm} * \dot{m}_{Exhaust} \frac{MW_{NOx}}{MW_{Exhaust}}$$

where, $\dot{m}_{NOx}$ is the NOx mass flow in g/sec; $\dot{m}_{Exhaust}$ is the Exhaust flow in g/sec; $MW_{NOx}$ is the molecular weight of $NO_2$; $MW_{Exhaust}$ is the molecular weight of Exhaust gas; $NOx_{ppm}$ is the NOx concentration in the exhaust gas as measured by the NOx sensor 608, 708 in ppm ECU 800 then uses the NOx mass flow value for each leg to determine the dosing requirement for each leg using a control system design that adjusts the dosing based upon the measurements of NOx, NH3, urea and the exhaust flow in accordance with known control concepts, such as described in US Patent Application Publication 2010/0229531. ECU 800 then generates control signals and sends the signals via circuits 640, 740 to injectors 604, 704 to control the injectors in such a manner to inject the desired target dosing quantity/amount of reductant, i.e. urea. The system may adjust the dosing in small increments or decrements to achieve a more balanced application of dosing agent in real time. There may be governing limits as to the amount of each increase (increment) and the amount of each decrease (decrement) in dosing. The process loops or continually operates to recalculate exhaust flow, NOx flow, and desired dosing amounts or adjustments for each leg and then controls the dosing amounts for each leg independently, all based on the latest pressure differential from sensor 502 and/or mass flow signal from sensor 504, and other real time data, such as NOx emissions signals from sensors 608, 708, thereby providing real time reductant dosing control and NOx conversion management to maintain NOx emissions within acceptable limits.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An exhaust flow detection and variable dosing system for treating exhaust flow from an engine, comprising:
    a first exhaust flow leg positioned to receive the exhaust flow from the engine;
    a first selective catalytic reducer positioned along said first exhaust flow leg;
    a second exhaust flow leg positioned to receive the exhaust flow from the engine in parallel to the exhaust flow in said first exhaust flow leg;
    a second selective catalytic reducer positioned along said second exhaust flow leg;
    a cross passage connecting said first and said second exhaust flow legs upstream of said selective catalytic reducers to receive exhaust flow;
    a sensor positioned along said cross passage to detect at least one of differential pressure between said first and said second exhaust flow legs, and exhaust flow in said cross passage, said sensor adapted to generate a cross passage signal corresponding to said at least one of differential pressure and said cross passage exhaust flow;
    a dosing treatment supply containing a dosing agent;
    a dosing circuit connecting said dosing treatment supply to each of said first and said second exhaust flow legs at or upstream of said first and said second selective catalytic reducers;
    at least one dosing device positioned along said dosing circuit to control the amount of said dosing agent delivered to each exhaust leg; and
    an electronic control unit adapted to receive said cross passage signal and independently control the amount of said dosing agent delivered to said first and said second exhaust flow legs based on said cross passage signal.

2. The system of claim 1, wherein each of said first and said second exhaust flow legs includes an oxidation catalyst and a particulate filter upstream of a connection of said dosing circuit to said first and said second exhaust flow legs, said cross passage connected to said first and said second exhaust legs downstream of said particulate filter.

3. The system of claim 1, wherein said sensor includes a differential pressure sensor connected to said cross passage at two locations.

4. The system of claim 3, wherein said cross passage includes a venturi positioned between said two locations.

5. The system of claim 1, wherein said sensor comprises at least one mass flow sensor.

6. The system of claim 1, wherein said electronic control unit is adapted to generate a dosing control signal based on said cross passage signal to control said at least one dosing device to vary the amount of said dosing agent delivered to at least one of said first and said second exhaust flow legs.

7. The system of claim 1, wherein said electronic control unit is adapted to determine an exhaust mass flow for each of said first and said second exhaust flow legs based on said cross passage signal, determine a NOx mass flow in each of said first and said second exhaust flow legs based on the respective exhaust mass flow, and control the amount of said dosing agent delivered to at least one of said first and said second exhaust legs based on the respective NOx mass flow.

8. A method of detecting exhaust flow and treating exhaust flow in an engine exhaust system having multiple exhaust legs, comprising:
    flowing exhaust gas through a first exhaust flow leg containing a first selective catalytic reducer;
    flowing exhaust gas through a second exhaust flow leg positioned in parallel to the exhaust flow in said first exhaust flow leg, said second exhaust flow leg containing a second selective catalytic reducer;
    providing a cross passage connecting said first and said second exhaust flow legs upstream of said selective catalytic reducers to receive exhaust flow;
    providing a sensor positioned along the cross passage to detect a differential pressure between said first and said second exhaust flow legs and generating a pressure signal corresponding to said differential pressure; and
    delivering an amount of a dosing agent to each of said first and said second exhaust flow legs based on said pressure signal.

9. The method of claim 8, further including generating a dosing control signal based on said pressure signal to control the amount of said dosing agent delivered to at least one of said first and said second exhaust flow legs.

10. The method of claim 8, further including determining an exhaust mass flow for each of said first and said second exhaust flow legs based on said pressure signal, determining a NOx mass flow in each of said first and said second exhaust flow legs based on the respective exhaust mass flow, and controlling the amount of said dosing agent delivered to at least one of said first and said second exhaust legs based on the respective NOx mass flow.

11. The method of claim 8, further including a venturi positioned in the cross passage, the pressure sensor positioned to detect the differential pressure across said venturi.

12. A method of detecting exhaust flow and treating exhaust flow in an engine exhaust system having multiple exhaust legs, comprising:
    flowing exhaust gas through a first exhaust flow leg containing a first selective catalytic reducer;
    flowing exhaust gas through a second exhaust flow leg positioned in parallel to the exhaust flow in said first exhaust flow leg, said second exhaust flow leg containing a second selective catalytic reducer;

providing a cross passage connecting said first and said second exhaust flow legs upstream of said selective catalytic reducers to receive exhaust flow;

detecting a mass flow of the exhaust gas flowing in said cross passage and generating a mass flow signal; and delivering an amount of a dosing agent to each of said first and said second exhaust flow legs based on said mass flow signal.

13. The method of claim 12, further including generating a dosing control signal based on said mass flow signal to control the amount of said dosing agent delivered to at least one of said first and said second exhaust flow legs.

14. The method of claim 12, further including determining an exhaust mass flow for each of said first and said second exhaust flow legs based on said mass flow signal, determining a NOx mass flow in each of said first and said second exhaust flow legs based on the respective exhaust mass flow, and controlling the amount of said dosing agent delivered to at least one of said first and said second exhaust legs based on the respective NOx mass flow.

* * * * *